United States Patent
Marcu et al.

(10) Patent No.: US 8,234,106 B2
(45) Date of Patent: Jul. 31, 2012

(54) BUILDING A TRANSLATION LEXICON FROM COMPARABLE, NON-PARALLEL CORPORA

(75) Inventors: Daniel Marcu, Hermosa Beach, CA (US); Kevin Knight, Hermosa Beach, CA (US); Dragos Stefan Munteanu, Los Angeles, CA (US); Philipp Koehn, Venice, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 12/576,110

(22) Filed: Oct. 8, 2009

(65) Prior Publication Data
US 2010/0042398 A1 Feb. 18, 2010

Related U.S. Application Data

(63) Continuation of application No. 10/401,124, filed on Mar. 26, 2003, now Pat. No. 7,620,538.

(60) Provisional application No. 60/368,070, filed on Mar. 26, 2002, provisional application No. 60/368,447, filed on Mar. 27, 2002.

(51) Int. Cl.
*G06F 17/28* (2006.01)
(52) U.S. Cl. ........................ 704/2; 704/7; 704/8; 704/10
(58) Field of Classification Search ................ 704/2, 10, 704/7, 8
See application file for complete search history.

(56) References Cited

U.S. PATENT DOCUMENTS

| | | | |
|---|---|---|---|
| 4,502,128 A | | 2/1985 | Okajima et al. |
| 4,599,691 A | * | 7/1986 | Sakaki et al. ................ 704/2 |
| 4,615,002 A | | 9/1986 | Innes |
| 4,661,924 A | | 4/1987 | Okamoto et al. |
| 4,787,038 A | | 11/1988 | Doi et al. |
| 4,791,587 A | | 12/1988 | Doi |
| 4,800,522 A | | 1/1989 | Miyao et al. |
| 4,814,987 A | | 3/1989 | Miyao et al. |
| 4,942,526 A | * | 7/1990 | Okajima et al. ............ 704/10 |
| 4,980,829 A | | 12/1990 | Okajima et al. |
| 5,020,112 A | | 5/1991 | Chou |
| 5,088,038 A | | 2/1992 | Tanaka et al. |
| 5,091,876 A | | 2/1992 | Kumano et al. |

(Continued)

FOREIGN PATENT DOCUMENTS
EP 0469884 2/1992

(Continued)

OTHER PUBLICATIONS

Reinhard Rapp "Automatic identification of Word translations from Unrelated English and German Corpora", 37th Annual Meeting on the Asspocation for Computational Linguistics, Jun. 1999, pp. 519-526.*

(Continued)

*Primary Examiner* — Jakieda Jackson
(74) *Attorney, Agent, or Firm* — Carr & Ferrell LLP

(57) ABSTRACT

A machine translation system may use non-parallel monolingual corpora to generate a translation lexicon. The system may identify identically spelled words in the two corpora, and use them as a seed lexicon. The system may use various clues, e.g., context and frequency, to identify and score other possible translation pairs, using the seed lexicon as a basis. An alternative system may use a small bilingual lexicon in addition to non-parallel corpora to learn translations of unknown words and to generate a parallel corpus.

28 Claims, 9 Drawing Sheets

U.S. PATENT DOCUMENTS

| | | | |
|---|---|---|---|
| 5,146,405 A | | 9/1992 | Church |
| 5,167,504 A | * | 12/1992 | Mann .......................... 434/157 |
| 5,181,163 A | * | 1/1993 | Nakajima et al. ............... 704/10 |
| 5,212,730 A | | 5/1993 | Wheatley et al. |
| 5,218,537 A | | 6/1993 | Hemphill et al. |
| 5,220,503 A | | 6/1993 | Suzuki et al. |
| 5,267,156 A | | 11/1993 | Nomiyama |
| 5,268,839 A | | 12/1993 | Kaji |
| 5,295,068 A | | 3/1994 | Nishino et al. |
| 5,311,429 A | | 5/1994 | Tominaga |
| 5,387,104 A | | 2/1995 | Corder |
| 5,432,948 A | | 7/1995 | Davis et al. |
| 5,442,546 A | | 8/1995 | Kaji et al. |
| 5,477,450 A | | 12/1995 | Takeda et al. |
| 5,477,451 A | | 12/1995 | Brown et al. |
| 5,495,413 A | | 2/1996 | Kutsumi et al. |
| 5,497,319 A | | 3/1996 | Chong et al. |
| 5,510,981 A | | 4/1996 | Berger et al. |
| 5,528,491 A | | 6/1996 | Kuno et al. |
| 5,535,120 A | | 7/1996 | Chong et al. |
| 5,541,836 A | | 7/1996 | Church et al. |
| 5,541,837 A | | 7/1996 | Fushimoto |
| 5,548,508 A | | 8/1996 | Nagami |
| 5,644,774 A | | 7/1997 | Fukumochi et al. |
| 5,675,815 A | | 10/1997 | Yamauchi et al. |
| 5,687,383 A | | 11/1997 | Nakayama et al. |
| 5,696,980 A | * | 12/1997 | Brew .......................... 704/273 |
| 5,724,593 A | | 3/1998 | Hargrave, III et al. |
| 5,752,052 A | | 5/1998 | Richardson et al. |
| 5,754,972 A | | 5/1998 | Baker et al. |
| 5,761,631 A | | 6/1998 | Nasukawa |
| 5,761,689 A | | 6/1998 | Rayson et al. |
| 5,768,603 A | | 6/1998 | Brown et al. |
| 5,779,486 A | | 7/1998 | Ho et al. |
| 5,781,884 A | | 7/1998 | Pereira et al. |
| 5,794,178 A | | 8/1998 | Caid et al. |
| 5,805,832 A | | 9/1998 | Brown et al. |
| 5,806,032 A | | 9/1998 | Sproat |
| 5,819,265 A | | 10/1998 | Ravin et al. |
| 5,826,219 A | | 10/1998 | Kutsumi |
| 5,826,220 A | | 10/1998 | Takeda et al. |
| 5,845,143 A | | 12/1998 | Yamauchi et al. |
| 5,848,385 A | | 12/1998 | Poznanski et al. |
| 5,848,386 A | | 12/1998 | Motoyama |
| 5,855,015 A | | 12/1998 | Shoham |
| 5,864,788 A | | 1/1999 | Kutsumi |
| 5,867,811 A | | 2/1999 | O'Donoghue |
| 5,870,706 A | | 2/1999 | Alshawi |
| 5,893,134 A | * | 4/1999 | O'Donoghue et al. ....... 715/264 |
| 5,903,858 A | | 5/1999 | Saraki |
| 5,907,821 A | | 5/1999 | Kaji et al. |
| 5,909,681 A | | 6/1999 | Passera et al. |
| 5,966,685 A | | 10/1999 | Flanagan et al. |
| 5,983,169 A | | 11/1999 | Kozma |
| 5,987,402 A | | 11/1999 | Murata et al. |
| 5,987,404 A | | 11/1999 | Della Pietra et al. |
| 5,991,710 A | | 11/1999 | Papineni et al. |
| 5,995,922 A | | 11/1999 | Penteroudakis et al. |
| 6,018,617 A | | 1/2000 | Sweitzer et al. |
| 6,031,984 A | | 2/2000 | Walser |
| 6,032,111 A | | 2/2000 | Mohri |
| 6,064,819 A | | 5/2000 | Franssen et al. |
| 6,064,951 A | | 5/2000 | Park et al. |
| 6,073,143 A | | 6/2000 | Nishikawa et al. |
| 6,077,085 A | | 6/2000 | Parry et al. |
| 6,092,034 A | | 7/2000 | McCarley et al. |
| 6,119,077 A | | 9/2000 | Shinozaki |
| 6,131,082 A | | 10/2000 | Hargrave, III et al. |
| 6,161,082 A | | 12/2000 | Goldberg et al. |
| 6,182,014 B1 | | 1/2001 | Kenyon et al. |
| 6,182,027 B1 | | 1/2001 | Nasukawa et al. |
| 6,205,456 B1 | | 3/2001 | Nakao |
| 6,223,150 B1 | | 4/2001 | Duan et al. |
| 6,233,544 B1 | | 5/2001 | Alshawi |
| 6,233,545 B1 | | 5/2001 | Datig |
| 6,233,546 B1 | | 5/2001 | Datig |
| 6,236,958 B1 | | 5/2001 | Lange et al. |
| 6,269,351 B1 | | 7/2001 | Black |
| 6,275,789 B1 | | 8/2001 | Moser et al. |
| 6,278,967 B1 | | 8/2001 | Akers et al. |
| 6,278,969 B1 | | 8/2001 | King et al. |
| 6,285,978 B1 | | 9/2001 | Bernth et al. |
| 6,289,302 B1 | | 9/2001 | Kuo |
| 6,304,841 B1 | | 10/2001 | Berger et al. |
| 6,311,152 B1 | | 10/2001 | Bai et al. |
| 6,317,708 B1 | | 11/2001 | Witbrock et al. |
| 6,327,568 B1 | | 12/2001 | Joost |
| 6,330,529 B1 | | 12/2001 | Ito |
| 6,330,530 B1 | | 12/2001 | Horiguchi et al. |
| 6,356,864 B1 | | 3/2002 | Foltz et al. |
| 6,360,196 B1 | | 3/2002 | Poznanski et al. |
| 6,389,387 B1 | | 5/2002 | Poznanski et al. |
| 6,393,388 B1 | | 5/2002 | Franz et al. |
| 6,393,389 B1 | | 5/2002 | Chanod et al. |
| 6,415,250 B1 | | 7/2002 | van den Akker |
| 6,460,015 B1 | | 10/2002 | Hetherington et al. |
| 6,470,306 B1 | | 10/2002 | Pringle et al. |
| 6,473,729 B1 | | 10/2002 | Gastaldo et al. |
| 6,480,698 B2 | | 11/2002 | Ho et al. |
| 6,490,549 B1 | | 12/2002 | Ulicny et al. |
| 6,498,921 B1 | | 12/2002 | Ho et al. |
| 6,502,064 B1 | | 12/2002 | Miyahira et al. |
| 6,529,865 B1 | | 3/2003 | Duan et al. |
| 6,535,842 B1 | | 3/2003 | Roche et al. |
| 6,587,844 B1 | | 7/2003 | Mohri |
| 6,647,364 B1 | | 11/2003 | Yumura et al. |
| 6,691,279 B2 | | 2/2004 | Yoden et al. |
| 6,745,161 B1 | | 6/2004 | Arnold et al. |
| 6,757,646 B2 | | 6/2004 | Marchisio |
| 6,778,949 B2 | | 8/2004 | Duan et al. |
| 6,782,356 B1 | | 8/2004 | Lopke |
| 6,810,374 B2 | | 10/2004 | Kang |
| 6,848,080 B1 | | 1/2005 | Lee et al. |
| 6,857,022 B1 | | 2/2005 | Scanlan |
| 6,885,985 B2 | | 4/2005 | Hull |
| 6,901,361 B1 | | 5/2005 | Portilla |
| 6,904,402 B1 | * | 6/2005 | Wang et al. ..................... 704/10 |
| 6,952,665 B1 | | 10/2005 | Shimomura et al. |
| 6,983,239 B1 | | 1/2006 | Epstein |
| 6,996,520 B2 | | 2/2006 | Levin |
| 6,999,925 B2 | | 2/2006 | Fischer et al. |
| 7,013,262 B2 | | 3/2006 | Tokuda et al. |
| 7,016,827 B1 | | 3/2006 | Ramaswamy et al. |
| 7,016,977 B1 | | 3/2006 | Dunsmoir et al. |
| 7,024,351 B2 | | 4/2006 | Wang |
| 7,031,911 B2 | | 4/2006 | Zhou et al. |
| 7,050,964 B2 | | 5/2006 | Menzes et al. |
| 7,085,708 B2 | | 8/2006 | Manson |
| 7,103,531 B2 | | 9/2006 | Moore |
| 7,107,204 B1 | | 9/2006 | Liu et al. |
| 7,107,215 B2 | | 9/2006 | Ghali |
| 7,113,903 B1 | | 9/2006 | Riccardi et al. |
| 7,143,036 B2 | | 11/2006 | Weise |
| 7,146,358 B1 | | 12/2006 | Gravano et al. |
| 7,149,688 B2 | | 12/2006 | Schalkwyk |
| 7,174,289 B2 | | 2/2007 | Sukehiro |
| 7,177,792 B2 | | 2/2007 | Knight et al. |
| 7,191,115 B2 | | 3/2007 | Moore |
| 7,197,451 B1 | | 3/2007 | Carter et al. |
| 7,206,736 B2 | | 4/2007 | Moore |
| 7,209,875 B2 | | 4/2007 | Quirk et al. |
| 7,219,051 B2 | | 5/2007 | Moore |
| 7,239,998 B2 | | 7/2007 | Xun |
| 7,249,012 B2 | | 7/2007 | Moore |
| 7,249,013 B2 | | 7/2007 | Al-Onaizan et al. |
| 7,283,950 B2 | | 10/2007 | Pournasseh et al. |
| 7,295,962 B2 | | 11/2007 | Marcu |
| 7,302,392 B1 | | 11/2007 | Thenthiruperai et al. |
| 7,319,949 B2 | | 1/2008 | Pinkham |
| 7,340,388 B2 | | 3/2008 | Soricut et al. |
| 7,346,487 B2 | | 3/2008 | Li |
| 7,346,493 B2 | | 3/2008 | Ringger et al. |
| 7,349,839 B2 | | 3/2008 | Moore |
| 7,356,457 B2 | | 4/2008 | Pinkham et al. |
| 7,373,291 B2 | | 5/2008 | Garst |
| 7,383,542 B2 | | 6/2008 | Richardson et al. |
| 7,389,222 B1 | | 6/2008 | Langmead et al. |

| | | |
|---|---|---|
| 7,389,234 B2 | 6/2008 | Schmid et al. |
| 7,409,332 B2 | 8/2008 | Moore |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,620,538 B2 | 11/2009 | Marcu et al. |
| 7,624,005 B2 | 11/2009 | Koehn et al. |
| 7,624,020 B2 | 11/2009 | Yamada et al. |
| 7,680,646 B2 | 3/2010 | Lux-Pogodalla et al. |
| 7,689,405 B2 | 3/2010 | Marcu |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,974,833 B2 | 7/2011 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0078091 A1 | 6/2002 | Vu et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0217052 A1 | 11/2003 | Rubenczyk et al. |
| 2003/0233222 A1 | 12/2003 | Soricut et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0059708 A1 | 3/2004 | Dean et al. |
| 2004/0068411 A1 | 4/2004 | Scanlan |
| 2004/0098247 A1 | 5/2004 | Moore |
| 2004/0111253 A1 | 6/2004 | Luo et al. |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0060160 A1 | 3/2005 | Roh et al. |
| 2005/0075858 A1 | 4/2005 | Pournasseh et al. |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0326912 A1 | 12/2009 | Ueffing |
| 2010/0017293 A1 | 1/2010 | Lung et al. |
| 2010/0174524 A1 | 7/2010 | Koehn |
| 2011/0029300 A1 | 2/2011 | Marcu et al. |
| 2011/0082684 A1 | 4/2011 | Soricut et al. |

FOREIGN PATENT DOCUMENTS

| | | |
|---|---|---|
| EP | 0715265 | 6/1996 |
| EP | 0933712 A2 | 8/1999 |
| EP | O933712 A3 | 1/2001 |
| JP | 07244666 | 9/1995 |
| JP | 10011447 | 1/1998 |
| JP | 11272672 | 10/1999 |

OTHER PUBLICATIONS

Dan Melamed "Automatic Evaluation and Uniform Filter Cascades for Inducing N-Best Translation Lexicons", ACL Proceedings of the 3rd Workshop on Very Large Corpora, 19995, pp. 184-198.*

Pascale Fung and Lo Yuen Yee, "An IR Approach for Translating New Words from nonparallel, Comparable Texts", 36th Annual Meeting on the Associated for Computational Linguistics, 17th International Conference on Computational Linguistics, 1998 pp. 414-420.*

Reinhard Rapp, "Identifying Word Translation in non-parallel Texts", rd Annual Meeting from the Association for Computational Linguistics, 1995, pp. 320-322.*

Pascale Fung "Compiling Bilingual Lexicon Entries from a Non-Parallel English-Chinese Corpus", Proceedings of the 3rd Workshop on Very Large Corpora, Boston Mass, 1995, pp. 173-183.*

William Gale and Kenneth Church "A Program for Aligning Sentences in Bilingual Corpora", 29th Annual Meeting on Association for Computational Linguistics, 1991, pp. 177-183.*

Mann, Multipath Tranlsation Lexicon Induction via Bridge language 2001, Johns Hopkins University, pp. 1-8.*

Wang, Y. and Waibel, A., "Decoding Algorithm in Statistical Machine Translation," 1996, Proc. of the 35th Annual Meeting of the ACL, pp. 366-372.

Wang, Ye-Yi, "Grammar Inference and Statistical Machine Translation," 1998, Ph.D Thesis, Carnegie Mellon University, Pittsburgh, PA.

Watanabe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wu, Dekai, "A Polynomial-Time Algorithm for Statistical Machine Translation," 1996, Proc. of 34th Annual Meeting of the ACL, pp. 152-158.

Wu, Dekai, "Stochastic Inversion Transduction Grammars and Bilingual Parsing of Parallel Corpora," 1997, Computational Linguistics, vol. 23, Issue 3, pp. 377-403.

Yamada, K. and Knight, K. "A Syntax-based Statistical Translation Model," D 2001, Proc. of the 39th Annual Meeting of the ACL, pp. 523-530.

Yamada, K. and Knight, K., "A Decoder for Syntax-based Statistical MT," 2001, Proceedings of the 40th Annual Meeting of the ACL, pp. 303-310.

Yamada K., "A Syntax-Based Statistical Translation Model," 2002 PhD Dissertation, pp. 1-141.

Yamamoto et al., "A Comparative Study on Translation Units for Bilingual Lexicon Extraction," 2001, Japan Academic Association for Copyright Clearance, Tokyo, Japan.

Yamamoto et al, "Acquisition of Phrase-level Bilingual Correspondence using Dependency Structure" In Proceedings of COLING-2000, pp. 933-939.

Yarowsky, David, "Unsupervised Word Sense Disambiguation Rivaling Supervised Methods," 1995, 33rd Annual Meeting of the ACL, pp. 189-196.

Zhang et al., "Synchronous Binarization for Machine Translations," Jun. 4-9, 2006, in Proc. Of the Human Language Technology Conference of the North American Chapter of the ACL, pp. 256-263.

Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

Patent Cooperation Treaty International Preliminary Report on Patentability and The Written Opinion, International application No. PCT/US2008/004296, Oct. 6, 2009, 5 pgs.

Cohen et al., "Spectral Bloom Filters," SIGMOD 2003, Jun. 9-12, 2003, ACM pp. 241-252.

Cohen, "Hardware-Assisted Algorithm for Full-text Large-dictionary String Matching Using n-gram Hashing," 1998, Information Processing and Management, vol. 34, No. 4, pp. 443-464.

Gupta et al., "Kelips: Building an Efficient and Stable P2P DHT thorough Increased Memory and Background Overhead," 2003 IPTPS, LNCS 2735, pp. 160-169.

Abney, Stephen, "Parsing by Chunks," 1991, Principle-Based Parsing: Computation and Psycholinguistics, vol. 44, pp. 257-279.

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

Al-Onaizan et al., "Translating with Scarce Resources," 2000, 17th National Conference of the American Association for Artificial Intelligence, Austin, TX, pp. 672-678.

Al-Onaizan, Y. and Knight K., "Machine Transliteration of Names in Arabic Text," Proceedings of ACL Workshop on Computational Approaches to Semitic Languages. Philadelphia, 2002.

Al-Onaizan, Y. and Knight, K., "Named Entity Translation: Extended Abstract", 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL, pp. 400-408.

Alshawi et al., "Learning Dependency Translation Models as Collections of Finite-State Head Transducers," 2000, Computational Linguistics, vol. 26, pp. 45-60.

Alshawi, Hiyan, "Head Automata for Speech Translation", Proceedings of the ICSLP 96, 1996, Philadelphia, Pennsylvania.

Ambati, "Dependency Structure Trees in Syntax Based Machine Translation," Spring 2008 Report <http://www.cs.cmu.edu/~vamshi/publications/DependencyMT_report.pdf>, pp. 1-8.

Arbabi et al., "Algorithms for Arabic name transliteration," Mar. 1994, IBM Journal of Research and Development, vol. 38, Issue 2, pp. 183-194.

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information," SIGIR 97, Philadelphia, PA, © 1997, pp. 84-91.

Bangalore, S. and Rambow, O., "Evaluation Metrics for Generation," 2000, Proc. of the 1st International Natural Language Generation Conf., vol. 14, pp. 1-8.

Bangalore, S. and Rambow, O., "Using TAGs, a Tree Model, and a Language Model for Generation," May 2000, Workshop TAG+5, Paris.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

Barnett et al., "Knowledge and Natural Language Processing," Aug. 1990, Communications of the ACM, vol. 33, Issue 8, pp. 50-71.

Baum, Leonard, "An Inequality and Associated Maximization Technique in Statistical Estimation for Probabilistic Functions of Markov Processes", 1972, Inequalities 3:1-8.

Berhe, G. et al., "Modeling Service-based Multimedia Content Adaptation in Pervasive Computing," CF '04 (Ischia, Italy) Apr. 14-16, 2004, pp. 60-69.

Bikel et al., "An Algorithm that Learns What's in a Name," 1999, Machine Learning Journal Special Issue on Natural Language Learning, vol. 34, pp. 211-232.

Boitet, C. et al., "Main Research Issues in Building Web Services," Proc. Of the 6th Symposium on Natural Language Processing, Human and Computer Processing of Language and Speech, © 2005, pp. 1-11.

Brants, Thorsten, "TnT—A Statistical Part-of-Speech Tagger," 2000, Proc. of the 6th Applied Natural Language Processing Conference, Seattle.

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

Brill, Eric. "Transformation-Based Error-Driven Learning and Natural Language Processing: A Case Study in Part of Speech Tagging",1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown et al., "Word-Sense Disambiguation Using Statistical Methods," 1991, Proc. of 29th Annual ACL, pp. 264-270.

Brown et al., "The Mathematics of Statistical Machine Translation: Parameter Estimation," 1993, Computational Linguistics, vol. 19, Issue 2, pp. 263-311.

Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.

Callan et al., "TREC and TIPSTER Experiments with INQUERY," 1994, Information Processing and Management, vol. 31, Issue 3, pp. 327-343.

Callison-Burch, C. et al., "Statistical Machine Translation with Word- and Sentence-Aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Cont. on Theoretical and Methodological Issue in MT, pp. 287-294.

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Cohen, Yossi, "Interpreter for FUF," (available at ftp:/lftp.cs.bgu.ac.il/ pUb/people/elhadad/fuf-life.lf).

Corston-Oliver, Simon, "Beyond String Matching and Cue Phrases: Improving Efficiency and Coverage in Discourse Analysis", 1998, The AAAI Spring Symposium on Intelligent Text Summarization, pp. 9-15.

Covington, "An Algorithm to Align Words for Historical Comparison", Computational Linguistics, 1996, 22(4), pp. 481-496.

Dagan, I. and Itai, A., "Word Sense Disambiguation Using a Second Language Monolingual Corpus", 1994, Association for Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on Content Based Multimedia Information Access (RIAO).

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Eisner, Jason,"Learning Non-Isomorphic Tree Mappings for Machine Translation," 2003, in Proc. of the 41st Meeting of the ACL, pp. 205-208.

Elhadad et al., "Floating Constraints in Lexical Choice", 1996, ACL, 23(2): 195-239.

Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad, Michael, "FUF: the Universal Unifier User Manual Version 5.2", 1993, Department of Computer Science, Ben Gurion University, Beer Sheva, Israel.

Elhadad, Michael, "Using Argumentation to Control Lexical Choice: A Functional Unification Implementation", 1992, Ph.D. Thesis, Graduate School of Arts and Sciences, Columbia University.

Elhadad. M., and Robin, J., "SURGE: a Comprehensive Plug-in Syntactic Realization Component for Text Generation", 1999 (available at http://www.cs.bgu.ac.il/-elhadad/pub.html).

Fleming, Michael et al., "Mixed-Initiative Translation of Web Pages," AMTA 2000, LNAI 1934, Springer-Verlag, Berlin, Germany, 2000, pp. 25-29.

Franz Josef Och, Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.

Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001.

Fung et al, "Mining Very-non parallel corpora: Parallel sentence and lexicon extractioin via bootstrapping and EM", In EMNLP 2004.

Gale, W. and Church, K., "A Program for Aligning Sentences in Bilingual Corpora," 1993, Computational Linguisitcs, vol. 19, No. 1, pp. 177-184.

Galley et al., "Scalable Inference and Training of Context-Rich Syntactic Translation Models," Jul. 2006, in Proc. Of the 21st International Conference on Computational Linguistics, pp. 961-968.

Galley et al., "What's in a translation rule?", 2004, in Proc. Of HLT/NAACL '04, pp. 1-8.

Gaussier et al, "A Geometric View on Bilingual Lexicon Extraction from Comparable Corpora", In Proceedings of ACL 2004, July.

Germann et al., "Fast Decoding and Optimal Decoding for Machine Translation", 2001, Proc. of the 39th Annual Meeting of the ACL, Toulouse, France, pp. 228-235.

Germann, Ulrich: "Building a Statistical Machine Translation System from Scratch: How Much Bang for the Buck Can We Expect?" Proc. of the Data-Driven MT Workshop of ACL-01, Toulouse, France, 2001.

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

Grefenstette, Gregory, "The World Wide Web as a Resource for Example-Based Machine Translation Tasks", 1999, Translating and the Computer 21, Proc. of the 21 st International Cant. on Translating and the Computer. London, UK, 12 pp.

Grossi et al, "Suffix Trees and their applications in string algorithms", In. Proceedings of the 1st South American Workshop on String Processing, Sep. 1993, pp. 57-76.

Habash, Nizar, "The Use of a Structural N-gram Language Model in Generation-Heavy Hybrid Machine Translation," University of Maryland, Univ. Institute for Advance Computer Studies, Sep. 8, 2004.

Hatzivassiloglou, V. et al., "Unification-Based Glossing",. 1995, Proc. of the International Joint Conference on Artificial Intelligence, pp. 1382-1389.

Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Ikel, D., Schwartz, R., and Weischedei, R., "An Algorithm that learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Klein et al., "Accurate Unlexicalized Parsing," Jul. 2003m, in Proc. of the 41st Annual Meeting of the ACL, pp. 423-430.

Knight et al., "Integrating Knowledge Bases and Statistics in MT," 1994, Proc. of the Conference of the Association for Machine Translation in the Americas.

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, K. and Al-Onaizan, Y., "A Primer on Finite-State Software for Natural Language Processing", 1999 (available at http://www.isLedullicensed-sw/carmel).

Knight, K. and Al-Onaizan, Y., "Translation with Finite-State Devices," Proceedings of the 4th AMTA Conference, 1998.

Knight, K. And Chander, I., "Automated Postediting of Documents," 1994, Proc. of the 12th Conference on Artificial Intelligence, pp. 779-784.

Knight, K. and Graehl, J., "Machine Transliteration", 1997, Proc. of the ACL-97, Madrid, Spain, pp. 128-135.

Knight, K. and Hatzivassiloglou, V., "Two-Level, Many-Paths Generation," D 1995, Proc. of the 33rd Annual Conference of the ACL, pp. 252-260.

Knight, K. and Luk, S., "Building a Large-Scale Knowledge Base for Machine Translation," 1994, Proc. of the 12th Conference on Artificial Intelligence, pp. 773-778.

Knight, K. and Marcu, D., "Statistics-Based Summarization—Step One: Sentence Compression," 2000, American Association for Artificial Intelligence Conference, pp. 703-710.

Knight, K. and Yamada, K., "A Computational Approach to Deciphering Unknown Scripts," 1999, Proc. of the ACL Workshop on Unsupervised Learning in Natural Language Processing.

Knight, Kevin, "A Statistical MT Tutorial Workbook," 1999, JHU Summer Workshop (available at http://www.isLedu/natural-language/mUwkbk.rtf).

Knight, Kevin, "Automating Knowledge Acquisition for Machine Translation," 1997, AI Magazine 18(4).

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight, Kevin, "Integrating Knowledge Acquisition and Language Acquisition", May 1992, Journal of Applied Intelligence, vol. 1, No. 4.

Knight, Kevin, "Learning Word Meanings by Instruction," 1996, Proc. of the D National Conference on Artificial Intelligence, vol. 1, pp. 447-454.

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kumar, R. and L1, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondecnes in Bilingual Corpora," In Proceedings of the 31st Annual Meeting of the ACL, 1993, pp. 17-22.

Kurohashi, S. and Nagao, M., "Automatic Detection of Discourse Structure by Checking Surface Information in Sentences," 1994, Proc. of COL-LING '94, vol. 2, pp. 1123-1127.

Langkilde, I. and Knight, K., "Generation that Exploits Corpus-Based Statistical Knowledge," 1998, Proc. of the COLING-ACL, pp. 704-710.

Langkilde, I. and Knight, K., "The Practical Value of N-Grams in Generation," 1998, Proc. of the 9th International Natural Language Generation Workshop, pp. 248-255.

Langkilde, Irene, "Forest-Based Statistical Sentence Generation," 2000, Proc. of the 1st Conference on North American chapter of the ACL, Seattle, WA, pp. 170-177.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde-Geary, Irene, "An Empirical Verification of Coverage and Correctness for a General-Purpose Sentence Generator," 1998, Proc. 2nd Int'l Natural Language Generation Conference.

Lee-Y.S.,"Neural Network Approach to Adaptive Learning: with an Application to Chinese Homophone Disambiguation," IEEE pp. 1521-1526.

Lita, L., et al., "tRuEcasing," Proceedings of the 41st Annual Meeting of the Assoc. for Computational Linguistics (In Hinrichs, E. and Roth, D.—editors), pp. 152-159.

Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACLIEACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Empirical Methods for Exploiting Parallel Texts," 2001, MIT Press, Cambridge, MA [table of contents].

Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.

Metze, F. et al., "The NESPOLE! Speech-to-Speech Translation System," Proc. Of the HLT 2002, 2nd Int'l. Conf. on Human Language Technology (San Francisco, CA), © 2002, pp. 378-383.

Mikheev et al., "Named Entity Recognition without Gazeteers," 1999, Proc. of European Chapter of the ACL, Bergen, Norway, pp. 1-8.

Miike et al., "A full-text retrieval system with a dynamic abstract generation function," 1994, Proceedings of SI-GIR '94, pp. 152-161.

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Mohri, et al. "Regular Approximation of Context-Free Grammars Through Transformation", 2000, pp. 251-261, "Robustness in Language and Speech Technology", Chapter 9, Kluwer Academic Publishers.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Nagao, K. et al., "Semantic Annotation and Transcoding: Making Web Content More Accessible," IEEE Multimedia, vol. 8, Issue 2 Apr.-Jun. 2001, pp. 69-81.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Niessen,S. and Ney, H, "Toward hierarchical models for statistical machine translation of inflected languages," 2001, Data-Driven Machine Translation Workshop, Toulouse, France, pp. 47-54.

Norvig, Peter, "Techniques for Automatic Memoization with Applications to Context-Free Parsing", Compuational Linguistics,1991, pp. 91-98, vol. 17, No. 1.

Och et al., "Improved Alignment Models for Statistical Machine Translation," 1999, Proc. of the Joint Conf. of Empirical Methods in Natural Language Processing and Very Large Corpora, pp. 20-28.

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI=http://dx.doi.org/10.3115/1075096.

Och, F. and Ney, H, "Improved Statistical Alignment Models," 2000, 38th Annual Meeting of the ACL, Hong Kong, pp. 440-447.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

Papineni et al., "Bleu: a Method for Automatic Evaluation of Machine Translation," 2001, IBM Research Report, RC22176(WQ102-022).

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

Pla et al., "Tagging and Chunking with Bigrams," 2000, Proc. of the 18th Conference on Computational Linguistics, vol. 2, pp. 614-620.

Qun, Liu, "A Chinese-English Machine Translation System Based on Micro-Engine Architecture," An Int'l. Conference on Translation and Information Technology, Hong Kong, Dec. 2000, pp. 1-10.

Rayner et al.,"Hybrid Language Processing in the Spoken Language Translator," IEEE, pp. 107-110.

Resnik, P. and Smith, A., "The Web as a Parallel Corpus," Sep. 2003, Computational Linguistics, Special Issue on Web as Corpus, vol. 29, Issue 3, pp. 349-380.

Resnik, P. and Yarowsky, D. "A Perspective on Word Sense Disambiguation Methods and Their Evaluation," 1997, Proceedings of SIGLEX '97, Washington, D.C., pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hili Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Rogati et al., "Resource Selection for Domain-Specific Cross-Lingual IR," ACM 2004, pp. 154-161.

Ruiqiang, Z. et al., "The NiCT-ATR Statistical Machine Translation System for the IWSLT 2006 Evaluation," submitted to IWSLT, 2006.

Russell, S. and Norvig, P., "Artificial Intelligence: A Modern Approach," 1995, Prentice-Hall, Inc., New Jersey [redacted—table of contents].

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.

Schutze, Hinrich, "Automatic Word Sense Discrimination," 1998, Computational Linguistics, Special Issue on Word Sense Disambiguation, vol. 24, Issue 1, pp. 97-123.

Selman et al., "A New Method for Solving Hard Satisfiability Problems," 1992, Proc. of the 10th National Conference on Artificial Intelligence, San Jose, CA, pp. 440-446.

Kumar, S. and Byrne, W. "Minimum Bayes-Risk Decoding for Statistical Machine Translation." HLTNAACL Conference. Mar. 2004, 8 pages.

Shapiro, Stuart (ed.), "Encyclopedia of Artificial Intelligence, 2nd edition", vol. D 2,1992, John Wiley & Sons Inc; "Unification" article, K. Knight, pp. 1630-1637.

Shirai, S., "A Hybrid Rule and Example-based Method for Machine Translation," NTT Communication Science Laboratories, pp. 1-5.

Sobashima et al., "A Bidirectional Transfer-Driven Machine Translation System for Spoken Dialogues," 1994, Proc. of 15th Conference on Computational Linguistics, vol. 1, pp. 64-68.

Soricut et al., "Using a large monolingual corpus to improve translation accuracy," 2002, Lecture Notes In Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sumita et al., "A Discourse Structure Analyzer for Japanese Text," 1992, Proc. of the International Conference on Fifth Generation Computer Systems, vol. 2, pp. 1133-1140.

Sun et al., "Chinese Named Entity Identification Using Class-based Language Model," 2002, Proc. of 19th International Conference on Computational Linguistics, Taipei, Taiwan, vol. 1, pp. 1-7.

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

Taylor et al., "The Penn Treebank: An Overview," in A. Abeill (ed.), D Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillman, C. and Xia, F., "A Phrase-Based Unigram Model for Statistical Machine Translation," 2003, Proc. of the North American Chapter of the ACL on Human Language Technology, vol. 2, pp. 106-108.

Tillmann et al., "A DP based Search Using Monotone Alignments in Statistical Translation," 1997, Proc. of the Annual Meeting of the ACL, pp. 366-372.

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

Ueffing et al., "Generation of Word Graphs in Statistical Machine Translation," 2002, Proc. of Empirical Methods in Natural Language Processing (EMNLP), pp. 156-163.

Varga et al, "Parallel corpora for medium density languages", In Proceedings of RANLP 2005, pp. 590-596.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Vogel, S. and Ney, H., "Construction of a Hierarchical Translation Memory," 2000, Proc. of Cooling 2000, Saarbrucken, Germany, pp. 1131-1135.

Koehn, P., et al, "Statistical Phrase-Based Translation," Proceedings of HLT-NAACL 2003 Main Papers , pp. 48-54 Edmonton, May-Jun. 2003. (NPL0222).

Abney, S.P., "Stochastic Attribute Value Grammars", Association for Computional Linguistics, 1997, pp. 597-618 (NPL0223).

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf> (NPL0224).

Tillman, C., et al, "Word Reordering and a Dynamic Programming Beam Search Algorithm for Statistical Machine Translation" <URL: http://acl.ldc.upenn.edu/J/J03/J03-1005.pdf> (NPL0225).

Wang, W., et al. "Capitalizing Machine Translation" In HLT-NAACL '06 Proceedings Jun. 2006. <http://www.isi.edu/natural-language/mt/hlt-naacl-06-wang.pdf> (NPL0226).

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf> (NPL0227).

Document, Wikipedia.com, web.archive.org (Feb. 24, 2004) <http://web.archive.org/web/20040222202831 /http://en.wikipedia.org/wikiiDocument>, Feb. 24, 2004 (NPL0220).

Identifying, Dictionary.com, wayback.archive.org (Feb. 28, 2007) <http://wayback.archive.org/web/200501 01 OOOOOO*/http:////dictionary.reference.com//browse//identifying>, Feb. 28, 2005 <http://web.archive.org/web/20070228150533/http://dictionary.reference.com/browse/identifying> (NPL0221).

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354. (NPL0228).

* cited by examiner

| Clues | Entries | Corpus |
|---|---|---|
| Spelling | 140 | 25.4% |
| Context | 107 | 31.9% |
| Preserving Similarity | 2 | 15.8% |
| Frequency | 2 | 17.0% |
| Spelling+Context | 185 | 38.6% |
| Spelling+Frequency | 151 | 27.4% |
| Spelling+Context+Similarity | 186 | 39.0% |
| All clues | 186 | 39.0% |

FIG. 3

1. Build the forward and backward BSTs.
2. Traverse each BST and extract left
   and right alignments for every node
   that represents a divergence
   For each word pair from the divergence set:
      a. create context alignments out of
         appropriate left and right alignments
      b. filter out invalid context alignments
      c. extract valid translation candidates
         from the context alignments

FIG. 10

BUILDING A TRANSLATION LEXICON FROM COMPARABLE, NON-PARALLEL CORPORA

CROSS-REFERENCE TO RELATED APPLICATIONS

This application is a Continuation of U.S. patent application Ser. No. 10/401,124, filed on Mar. 26, 2003, now U.S. Pat. No. 7,620,538, which claims priority to U.S. Provisional Application Ser. No. 60/368,070, filed on Mar. 26, 2002, and U.S. Provisional Application Ser. No. 60/368,447, filed on Mar. 27, 2002, the disclosures of which are incorporated by reference.

ORIGIN OF INVENTION

The research and development described in this application were supported by Defense Advanced Research Project Agency (DARPA) under grant number N66001-00-1-8914. The U.S. Government may have certain rights in the claimed inventions.

BACKGROUND

Machine translation (MT) concerns the automatic translation of natural language sentences from a first language (e.g., French) into another language (e.g., English). Systems that perform MT techniques are said to "decode" the source language into the target language.

Roughly speaking, statistical machine translation (SMT) divides the task of translation into two steps: a word-level translation model and a model for word reordering during the translation process. The statistical models may be trained on parallel corpora. Parallel corpora contain large amounts of text in one language along with their translation in another. Unfortunately, such corpora are available only in limited amounts and cover only in specific genres (Canadian politics, Hong Kong laws, etc). However, monolingual texts exist in higher quantities and in many domains and languages. The availability of monolingual corpora has been enhanced greatly due to the digital revolution and widespread use of the World Wide Web. Methods for processing such resources can therefore greatly benefit the field.

SUMMARY

In an embodiment, a system may be able to build a translation lexicon from comparable, non-parallel corpora. The system may identify all identically spelled words in the corpora and use these as a seed lexicon for other processes based on clues indicating possible translations.

In another embodiment, a system may align text segments in comparable, non-parallel corpora, matching strings in the corpora, and using the matched strings to build a parallel corpus. The system may build a Bilingual Suffix Tree (BST) and traverse edges of the BST to identify matched strings. The BST may also identify potential translations based on words in the corpora between matched strings.

BRIEF DESCRIPTION OF THE DRAWINGS

FIG. 3 is a table showing results of an experiment utilizing the system of FIG. 1.

FIG. 10 is psuedocode describing an algorithm for learning translations of unknown words.

DETAILED DESCRIPTION

Figure 1:
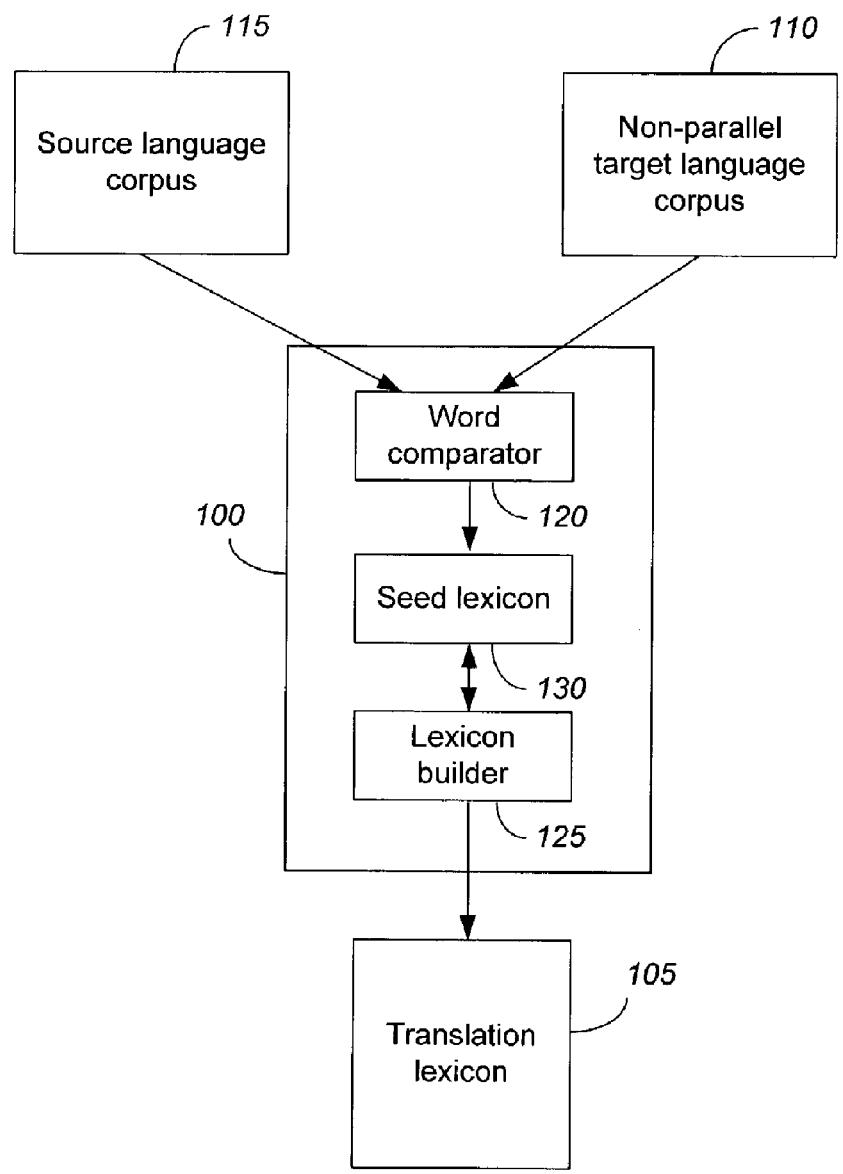
FIG. 1 is a block diagram of a system for building a translation lexicon according to an embodiment.

FIG. 1 shows a system 100 for building a translation lexicon 105 according to an embodiment. The system may use non-parallel monolingual corpora 110, 115 in two languages to automatically generate one-to-one mapping of words in the two languages.

The two monolingual corpora should be in a fairly comparable domain. For example, in an implementation, an English-German translation lexicon was generated from a 1990-1992 Wall Street Journal corpus on the English side and a 1995-1996 German news wire (DPA) on the German side. Both corpora are news sources in the general sense. However, they span different time periods and have a different orientation: the World Street Journal covers mostly business news, the German news wire mostly German politics.

The system 100 may use clues to find translations of words in the monolingual corpora. The first clue considered may be the existence of identical words in the two corpora. Due to cultural exchange, a large number of words that originate in one language may be adopted by others. Recently, this phenomenon can be seen with words such as "Internet U or "Aids u." These terms may be adopted verbatim or changed by well-established rules. For instance, "immigration" (German and English) has the Portuguese translation "immigraçao," as many words ending in -tion have translations with the same spelling except for the ending changed to çao.

Figure 2:
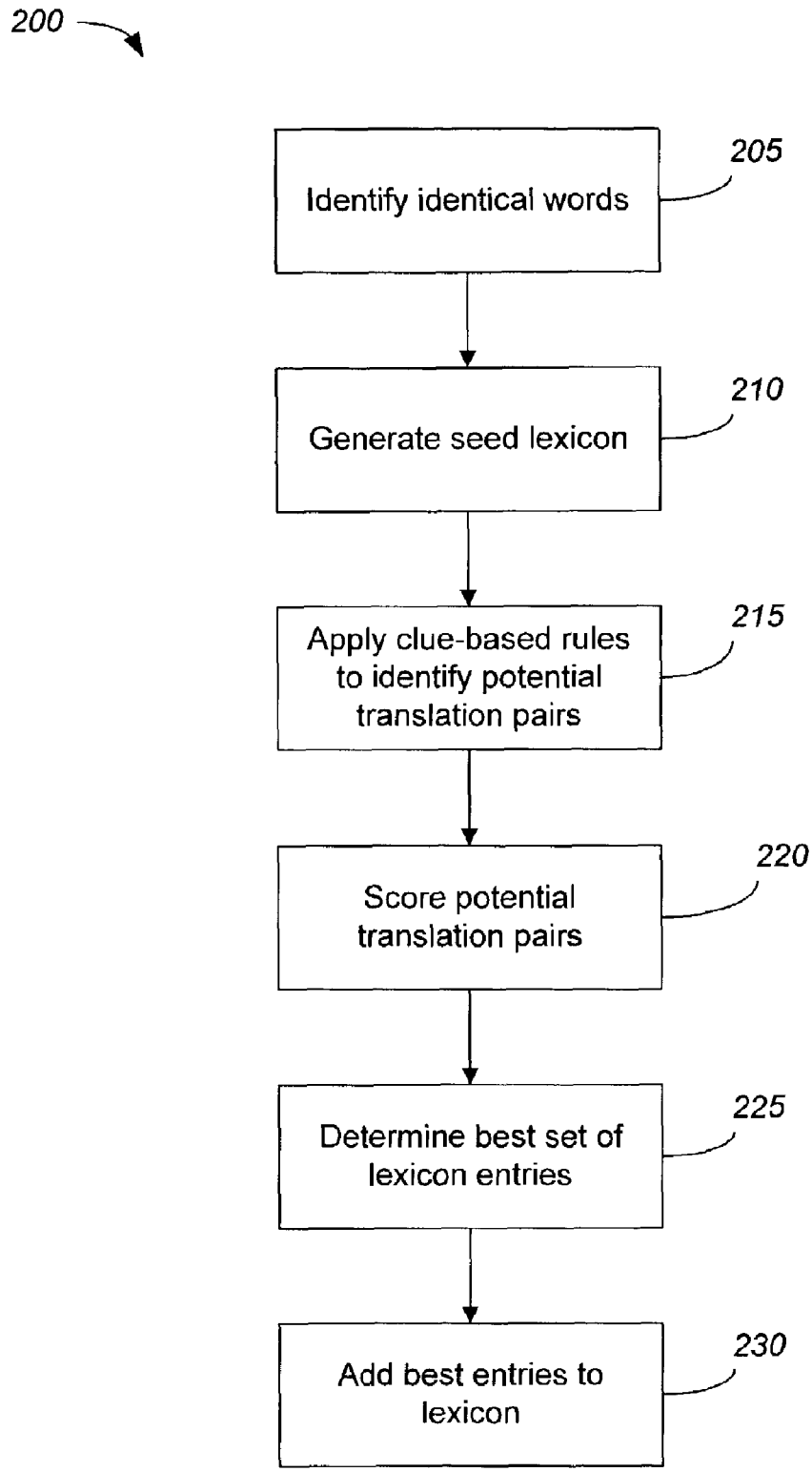
FIG. 2 is a flowchart describing a method for building a translation lexicon from non-parallel corpora.

FIG. 2 shows a flowchart describing a method 200 for building a translation lexicon from non-parallel corpora. A word comparator 120 may be used to collect pairs of identical words (block 205). In the English German implementation described above, 977 identical words were found. When checked against a benchmark lexicon, the mappings were found to be 88% correct.

The correctness of word mappings acquired in this fashion may depend highly on word length. While identical three-letter words were only translations of each other 60% of the time, this was true for 98% of ten-letter words. Clearly, for shorter words, the accidental existence of an identically spelled word in the other language word is much higher. Accordingly, the word comparator 120 may restrict the word length to be able to increase the accuracy of the collected word pairs. For instance, by relying only on words at least of length six, 622 word pairs were collected with 96% accuracy.

The identified identically spelled word pairs may be used as a seed lexicon 130 (block 210). A lexicon builder 125 may expand the seed lexicon into the larger translation lexicon 105 by applying rules based on clues which indicate probable translations. The lexicon builder 125 may use seed lexicon to bootstrap these methods, using the word pairs in the seed lexicon as correct translations.

As already mentioned, there are some well established transformation rules for the adoption of words from a foreign language. For German to English, this includes replacing the letters k and z by c and changing the ending -tät to -ty. Both these rules can be observed in the word pair Elektrizitat and electricity. The lexicon builder 125 may utilize these rules to expand the seed lexicon. In the English-German implementation, 363 additional word pairs were collected, with an accuracy of 91%.

The lexicon builder 125 extracts potential translation word pairs based on one or more clues. These clues may include similar spelling, similar context, preserving word similarity, and word frequency.

When words are adopted into another language, their spelling might change slightly in a manner that cannot be simply generalized in a rule, e.g., "website" and "Webseite." This is even more the case for words that can be traced back to common language roots, such as "friend" and "Freund," or "president" and "Präsident." Still, these words, often called "cognates," maintain a very similar spelling. This can be defined as differing in very few letters. This measurement can be formalized as the number of letters common in sequence between the two words, divided by the length of the longer word.

The example word pair "friend" and "freund" shares 5 letters (fr-e-nd), and both words have length 6, hence their spelling similarity is ⅚, or 0.83. This measurement may be referred to as the "longest common subsequence ratio." The lexicon builder 125 may measure the spelling similarity between every German and English word, and sort possible word pairs accordingly. This may be done in a greedy fashion, i.e., once a word is assigned to a word pair, the lexicon builder 125 does not look for another match.

Another clue is context. If the monolingual corpora are somewhat comparable, it can be assumed that a word that occurs in a certain context should have a translation that occurs in a similar context. The context may be defined by the frequencies of context words in surrounding positions. This context has to be translated into the other language, and the lexicon builder 125 can search the word with the most similar context.

The lexicon builder 125 may collect counts over words occurring in an n-word window, e.g., four words (n=4), around the target word. For each occurrence of a target word, the counts may be collected over how often certain context words occur in the two positions directly ahead of the target word and the two following positions. The counts may be collected separately for each position and then entered into a context vector with a dimension for each context word in each position. Finally, the raw counts are normalized. Vector comparison is done by adding all absolute differences of all components.

Alternatively, the lexicon builder 125 may count how often another word occurs in the same sentence as the target word. The counts may then be normalized by a using the tf/idf method, which is often used in information retrieval.

The seed lexicon may be used to construct context vectors that contain information about how a new unmapped word co-occurs with the seed words. This vector can be translated into the other language, since we already know the translations of the seed words are already known. The lexicon builder 125 can search for the best matching context vector in the target language, and decide upon the corresponding word to construct a word mapping. The lexicon builder 125 may compute all possible word, or context vector, matches. The best word matches may be collected in a greedy fashion.

Another clue is based on the assumption that pairs of words that are similar in one language should have translations that are similar in the other language. For instance, Wednesday is similar to Thursday as Mittwoch is similar to Donnerstag. Two words may be defined as similar if they occur in a similar context, which is the case for Wednesday and Thursday.

In one approach, the context vector for each word in the lexicon may consist of co-occurrence counts in respect to a number of peripheral tokens (basically, the most frequent words). These counts may be collected for each position in an n-word window around the word in focus.

Instead of comparing the co-occurrence counts directly, the Spearman rank order correlation may be applied. For each position, the tokens are compared in frequency and the frequency count is replaced by the frequency rank, e.g., the most frequent token count is replaced with 1 and the least frequent by n. The similarity of the two context vectors $a=(a_i)$ and $b=(b_i)$ is then defined by:

$$R(a,b) = 1 - \frac{6\sum(a_i - b_i)}{4n(n^2-1)}$$

The result is a matrix with similarity scores between all German words, and a second matrix with similarity scores between all English words. For a new word, the lexicon builder 125 may look up its similarity scores to seed words, thus creating a similarity vector. Such a vector can be translated into the other language. The translated vector can be compared to other vectors in the second language.

The lexicon builder 125 may perform a greedy search for the best matching similarity vectors and add the corresponding words to the lexicon.

Another clue is based on the assumption that in comparable corpora, the same concepts should occur with similar frequencies. Frequency may be defined as a ratio of the word frequencies normalized by the corpus sizes.

Each of the clues provides a matching score between two words (block 220), e.g., a German word and an English word. The likelihood of these two words being actual translations of each other may correlate to these scores. The lexicon builder 125 may employ a greedy search to determine the best set of lexicon entries based on these scores (block 225). First, the lexicon builder 125 searches for the highest score for any word pair. This is added to the lexicon (block 230), and word pairs that include either the German and English word are dropped from further search. This may be performed iteratively until all words are used up.

The lexicon builder 125 may combine different clues by adding up the matching scores. The scores can be weighted. For example, when using the spelling clue in combination with others, it may be useful to define a cutoff. If two words agree in 30% of their letters, this is generally as bad as if they do not agree in any, i.e., the agreements are purely coincidental.

FIG. 3 shows results of the English-German implementation. "Entries" indicate the number of correct lexicon entries that were added to a seed lexicon of 1337 identically spelled words, and "Corpus" indicates how well the resulting translation lexicon performs compared to the actual word-level translations in a parallel corpus.

The English-German implementation was restricted to nouns. Verbs, adjectives, adverbs and other part of speech may be handled in a similar way. They might also provide useful context information that is beneficial to building a noun lexicon. These methods may be also useful given a different starting point. For example, when building machine translation systems, some small parallel text should be available. From these, some high-quality lexical entries can be learned, but there will always be many words that are missing. These may be learned using the described methods.

Figure 4:
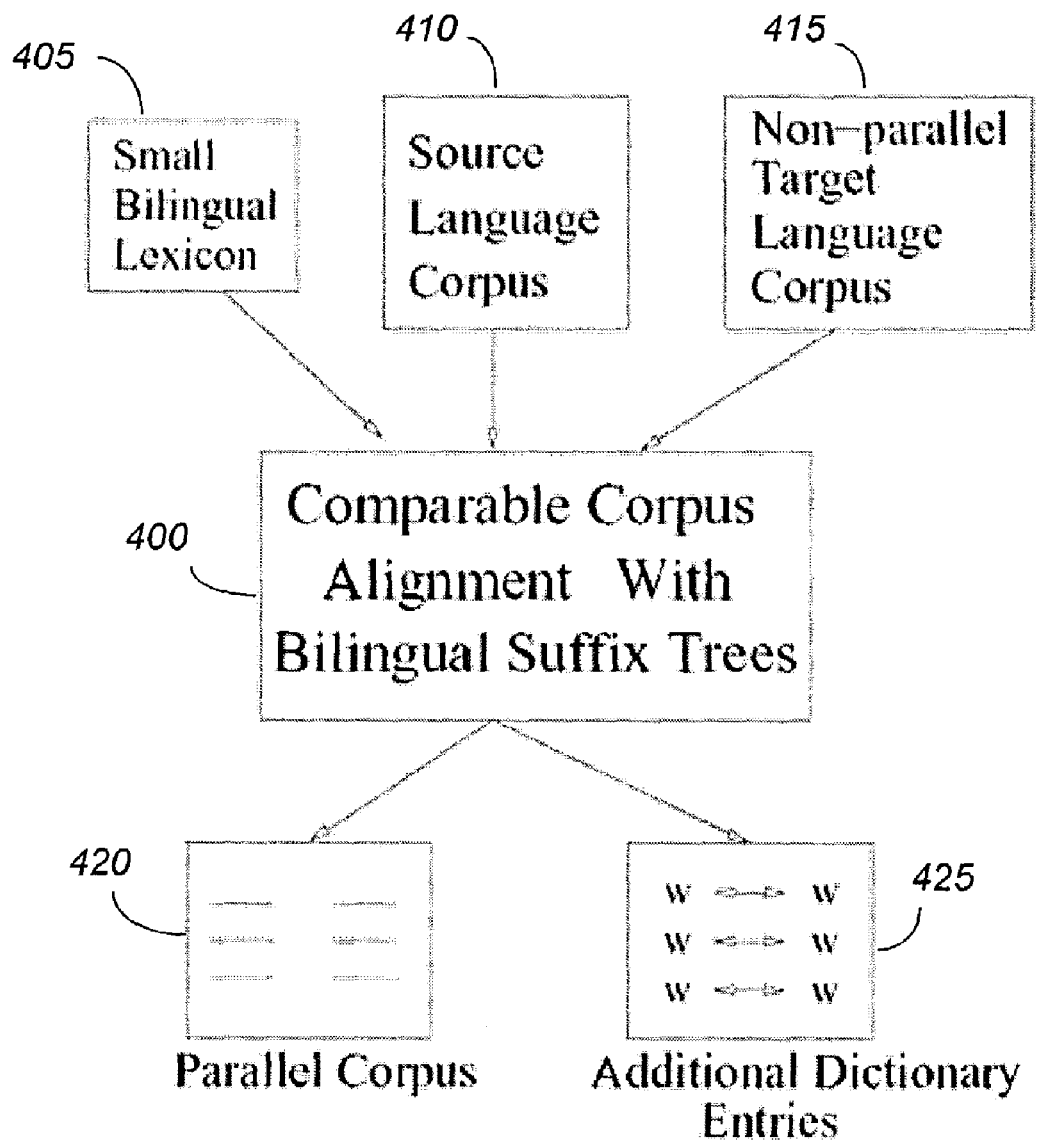
FIG. 4 is a block diagram of a system for building a translation lexicon according to another embodiment.

FIG. 4 shows a system 400 for building a translation lexicon according to another embodiment. The system 400 may also be used to build parallel corpora from comparable corpora. Given an initial bilingual lexicon 405 and two texts 410, 415 in each of the languages, the system 400 may identify parts of the texts which can be aligned (i.e., are mutual translations of each other according to the lexicon). The parts can be arbitrarily long, i.e., the system 400 may align sequences of a few words rather than or in addition to whole sentences or whole phrases. Based on these alignments, the system 400 may generate a parallel corpus 420 and identify translations 425 of words from the source language which are not in the lexicon.

For example, consider the following two sentences where the only unknown French word is "raison":

"Ce est pour cette raison que le initiative de le ministre . . . ;" and

"It is for this reason that the party has proposed . . . "

Since "Ce est pour cette" can be aligned with "It is for this" and "que le" with "that the," it is a reasonable assumption that "raison" can be translated by "reason." The system 400 may search the corpora for cases similar to this example.

The system 400 may use a suffix tree data structure in order to identify the alignments. The suffix tree of a string uniquely encodes all the suffixes of that string (and thus, implicitly, all its substrings too). The system 400 may first build such a tree of the target language corpus, and then add to each substrings all the substrings from the source language corpus that align to it. The next step is to identify unknown target language words that are surrounded by aligned substrings. The source language word that corresponds to the "well-aligned" unknown is considered to be a possible translation.

A suffix tree stores in linear space all suffixes of a given string. Such succinct encoding exposes the internal structure of the string, providing efficient (usually linear-time) solutions for many complex string problems, such as exact and approximate string matching, finding the longest common substring of multiple strings, and string compression. Formally, a suffix tree for a string S of length N has the following properties: each edge of the tree is labeled by a nonempty substring of S; each internal node other than the root has at least two children; no two edges out of a node can have edge-labels beginning with the same character/word; and (the key feature of the tree) there is a one-to-one correspondence between all suffixes of S and paths in the tree from the root to the leaves.

Figure 5:
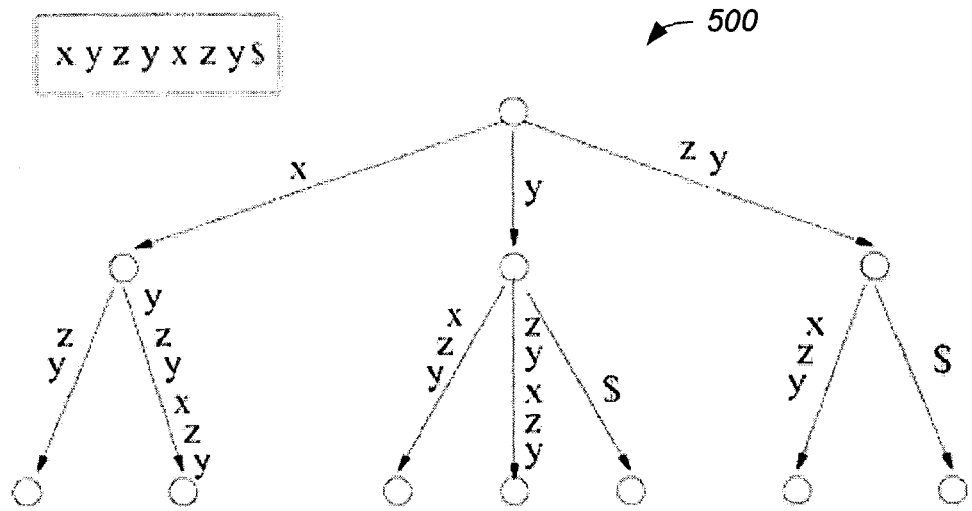
FIG. 5 is a suffix tree.

FIG. 5 shows the suffix tree 500 of string xyzyxzy. Note that if a suffix of a string is also a prefix of another suffix (as would be the case for suffix zy of string xyzyxzy), a proper suffix tree cannot be built for the string. The problem is that the path corresponding to that suffix would not end at a leaf, so the tree cannot have the last property in the list above. To avoid this, the system 400 appends an end-of-string marker "$" that appears nowhere else in the string. For clarity, the drawings only show the $ marker when necessary.

Figure 6:
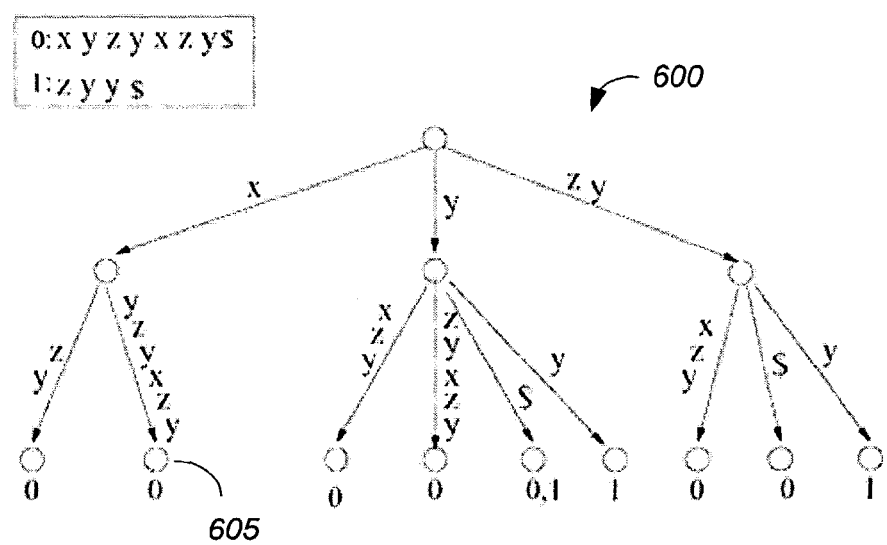
FIG. 6 is a Generalized Suffix Tree (GST).

Each monolingual corpus given as input to the system 400 may be divided into a set of sentences. The system 400 may use a variant of suffix trees that works with sets of strings, namely Generalized Suffix Trees (GST). In a GST of a set of strings, each path from the root to a leaf represents a suffix in one or more strings from the set. A conceptually easy way to build such a tree is to start by building a regular suffix tree for the first sentence in the corpus, and then for each of the other sentences to take their suffixes one by one and add them to the tree (if they are not already in it). FIG. 6 shows the GST 600 for a corpus of two sentences. The numbers at the leaves 605 of the tree show which sentences contain the suffix that ends there.

Building the suffix tree of a string takes time and space linear in the length of the string. Building a GST for a set of strings takes time and space linear in the sum of the lengths of all strings in the set.

Figure 7:
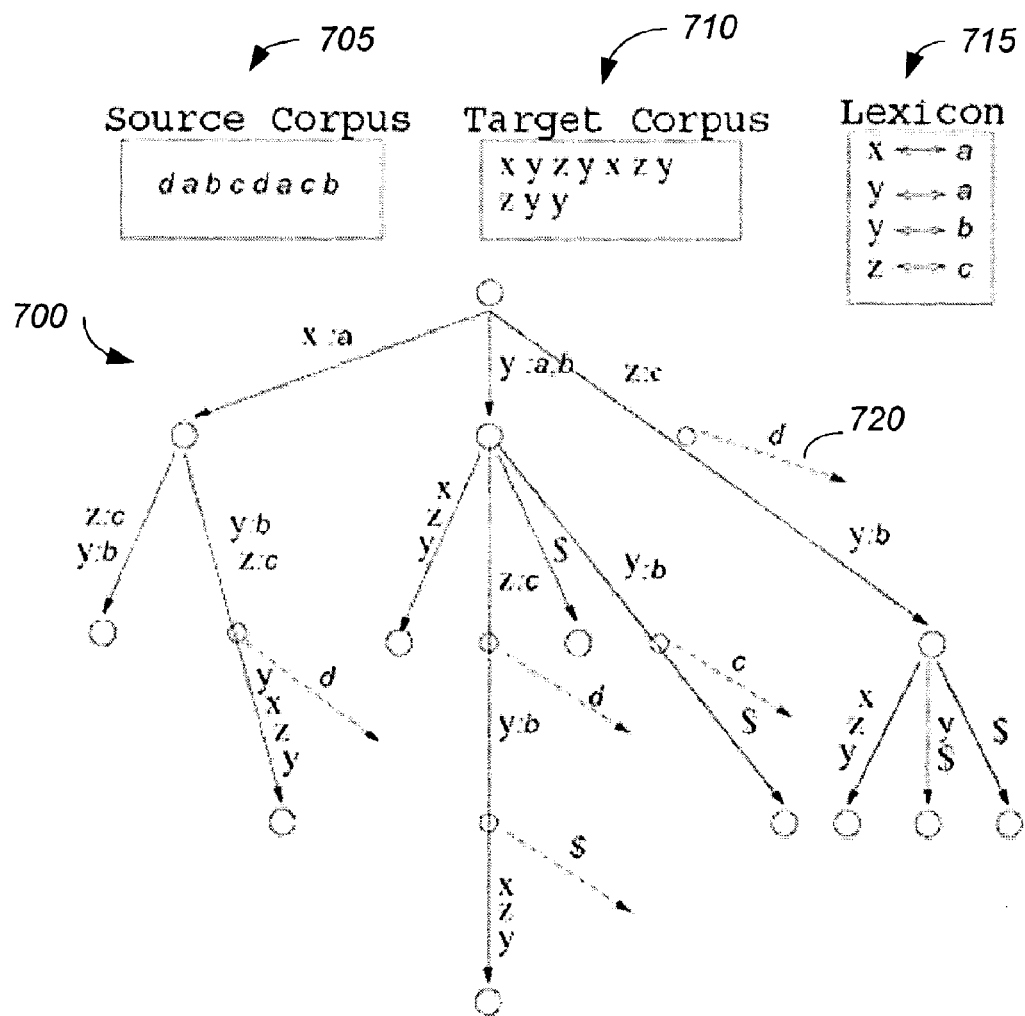
FIG. 7 is a Bilingual Suffix Tree (BST).

A Bilingual Suffix Tree (BST) is the result of matching a source language GST against a target language GST. Two strings (i.e., sequences of words) match if the corresponding words are translations of each other according to a bilingual lexicon. In order to perform the matching operation, all paths that correspond to an exhaustive traversal of one of the trees (the source tree) are traversed in the other (the target tree), until a mismatch occurs. In the process, the target tree is augmented with information about the alignments between its paths and those of the source, thus becoming a bilingual suffix tree. FIG. 7 shows two corpora 705, 710, a bilingual lexicon 715, and the corresponding BST 720. Edges drawn with dotted lines mark ends of alignment paths through the tree. Their labels are (unaligned) continuations of the source language substrings from the respective paths.

Since there is a one-to-one correspondence between the substrings in the text and the paths in the suffix trees, the operation described above will yield all pairs of substrings in the two corpora given as input and discover all partial monotone alignments defined by the lexicon.

If the lexicon is probabilistic, each matching between two words will be weighted by the corresponding translation probability. The paths in the resulting bilingual tree will also have weights associated with them, defined as the product of the matching probabilities of the words along the path.

Figure 8:
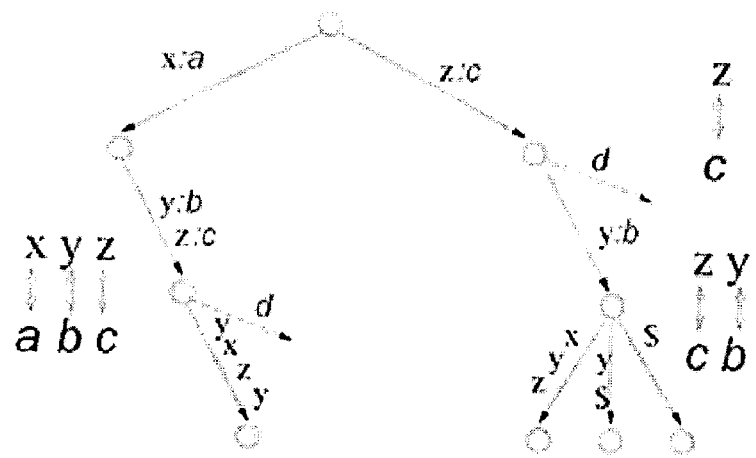
FIG. 8 is a portion of a BST showing example alignments.

BSTs are constructed to encode alignment information, therefore the extraction of parallel phrases amounts to a simple depth-first traversal of the tree. FIG. 8 shows some alignments we can extract from the BST in FIG. 7, a portion of which is shown in FIG. 8.

As can be seen in FIG. 4, there are three types of edge labels in a BST: only target language sequences (e.g., xzy), pairs of target and source language sequences (y:b followed by z:c) and only source language words (b or c). For alignment extraction, we are interested in edges of the third type, because they mark ends of alignments. Let e be an edge labeled only with a source language word, originating from node n. A path from the root to n will only traverse edges labeled with word pairs, defining two aligned sequences. The fact that n has outgoing edge e indicates there is a mismatch on the subsequent words of those two sequences. Thus, in order to extract all aligned substrings, the system 400 traverses the BST on edges labeled with word pairs, and extract all paths that end either at the leaves or at nodes that have outgoing edges labeled only with source language words.

Figure 9:
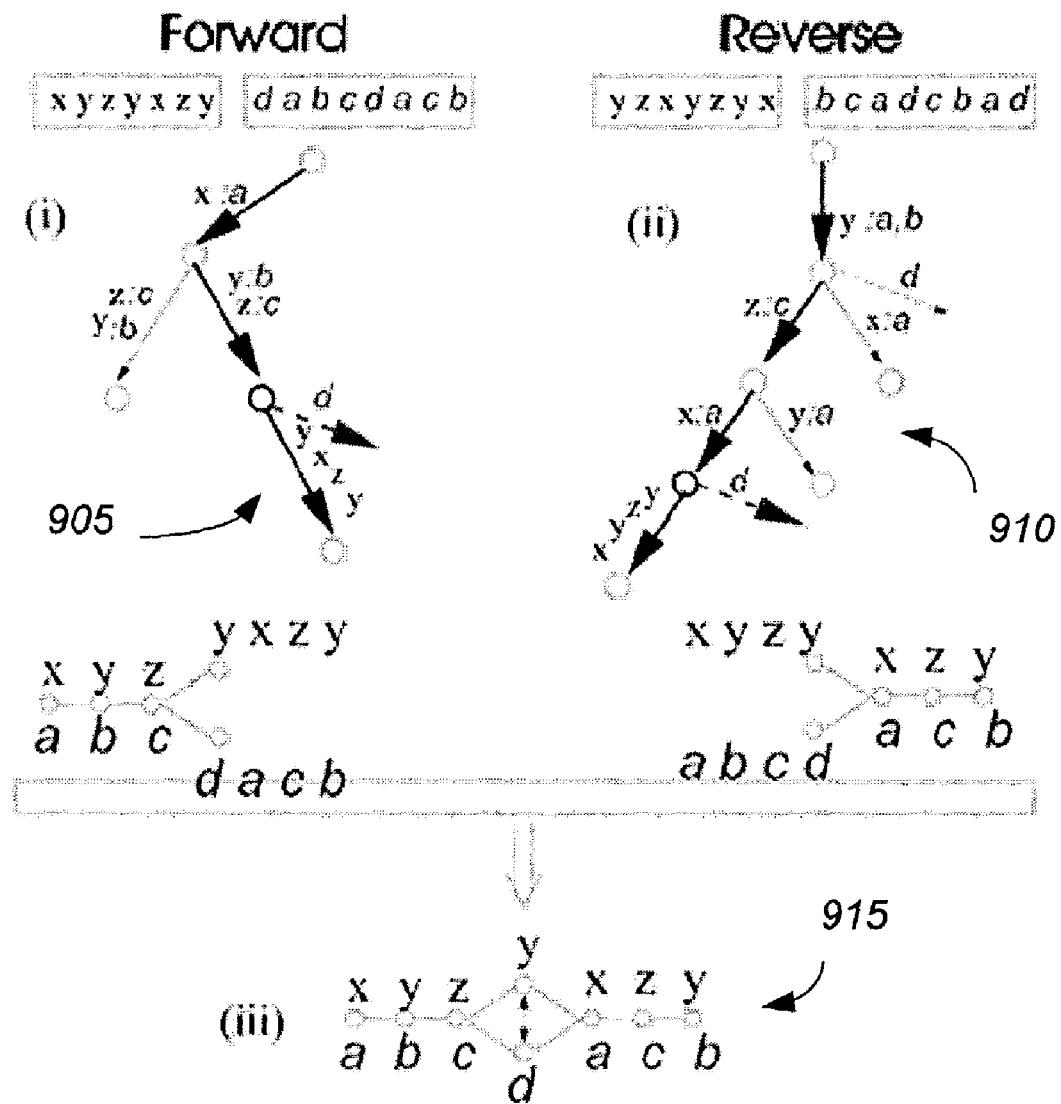
FIG. 9 are portions of a BST describing left and right alignments.

The heuristic by which the system 400 discovers new word translations is shown graphically in FIG. 9. FIG. 9(i) shows a branch 905 of the BST corresponding to the comparable corpus in the same figure. The path defined by the bold edges shows that sequences xyz and abc are aligned, and diverge (i.e., have a mismatch) at characters y and d, respectively. This may be taken as a weak indication that d and y are translations of each other. This indication would become stronger if, for example, the sequences following d and y in the two corpora would also be aligned. One way to verify this is to reverse both strings, build a BST for the reversed corpora (a reverse BST), and look for a common path that diverges at the same d and y. FIG. 9(ii) shows the reverse BST 910, and in bold, the path we are interested in. When d and y are surrounded by aligned sequences, we hypothesize that they are translations of each other.

For a pair of words from the two corpora, we use the terms "right alignment" and "left alignment" to refer to the aligned sequences that precede and respectively succeed the two words in each corpus. The left and right alignments and the two words delimited by them make up a context alignment. For example, the left alignment xyzabc, the right alignment xzy-acb and the words y and d in FIG. 9(iii) make up a context alignment 915.

Given a comparable corpus, this procedure will yield many context alignments which correspond to incorrect translations, such as that between the words "canadien" and "previous":

tout canadien serieux
any previous serious

In order to filter out such cases, the system 400 uses two simple heuristics: length and word content. Thus, for a context alignment to be valid, the left and right context together must contain at least three words, one of which must be an open-class word, e.g., a noun, verb, adjective, or adverb, classes which can have new words added to them. The translation candidate must also be an open-class word. The algorithm 1000 for learning translations of unknown words is summarized in FIG. 10. An advantage of the algorithm over previous approaches is that we do not provide as input to the algorithm a list of unknown words. Instead, the system automatically learns from the corpus both the unknown words and their translation, upon discovery of appropriate context alignments.

The system 400 was tested on an English-French comparable corpus, of approximately 1.3 million words –50.000 sentences for each language. It was obtained by taking two non-parallel, nonaligned segments from the Hansard corpus. The Hansard Corpus includes parallel texts in English and Canadian French, drawn from official records of the proceedings of the Canadian Parliament. A small bilingual lexicon of 6,900 entries was built using 5,000 sentences pairs (150,000 words for each language). The parallel corpus was taken from the Proceedings of the European Parliament (EuroParl) Note that the parallel corpus belongs to a different domain than the comparable corpus. Also the parallel corpus is extremely small. For low density languages, such a corpus can be built manually.

When given as input the comparable corpora described above and the bilingual lexicon of 6,900 entries, the algorithm 1000 found 33,926 parallel sequences, with length between three and seven words. Out of 100 randomly selected sequences, 95% were judged to be correct.

The system also found translations for thirty unknown French words. Of these, nine were correct, which means a precision of 30%.

For each of the two corpora, building the monolingual GST took only 1.5 minutes. The matching operation that yields the BST is the most time-consuming: it lasted 38 hours for the forward BST and 60 hours for the reverse BST. The extractions of all parallel phrases and of the translations took about 2 hours each. The experiments were run on a Linux® system 400 with an Intel® Pentium® 3 processor of 866 Mhz.

A number of embodiments have been described. Nevertheless, it will be understood that various modifications may be made without departing from the spirit and scope of the invention. For example, blocks in the flowcharts may be skipped or performed out of order and still produce desirable results. Also, the heuristics described herein may be combined with the alignment method described herein. Accordingly, other embodiments are within the scope of the following claims.

The invention claimed is:

1. A method for building a translation lexicon from non-parallel corpora by a machine translation system, the method comprising:
   identifying identically spelled words in a first corpus and a second corpus, the first corpus including words in a first language and the second corpus including words in a second language, wherein the first corpus and the second corpus are non-parallel and are accessed by the machine translation system;
   generating a seed lexicon by the machine translation system, the seed lexicon including identically spelled words; and
   expanding the seed lexicon by the machine translation system by identifying possible translations of words in the first and second corpora using one or more clues.

2. The method of claim 1 wherein said expanding comprises using the identically spelled words in the seed lexicon as accurate translations.

3. The method of claim 1, further comprising:
   identifying substantially identical words in the first and second corpora; and
   adding said substantially identical words to the seed lexicon.

4. The method of claim 3, wherein said identifying substantially identical words comprises
   applying transformation rules to words in the first corpora to form transformed words; and
   comparing said transformed words to words in the second corpora.

5. The method of claim 1, wherein said one or more clues includes similar spelling.

6. The method of claim 1, wherein said identifying comprises identifying cognates.

7. The method of claim 1, wherein said identifying comprises identifying word pairs having a minimum longest common subsequence ratio.

8. The method of claim 1, wherein said one or more clues includes similar context.

9. The method of claim 1, wherein said identifying comprises:
   identifying a plurality of context words; and
   identifying a frequency of context words in an n-word window around a target word.

10. The method of claim 9, further comprising generating a context vector.

11. The method of claim 1, wherein said identifying comprises identifying frequencies of occurrence of words in the first and second first corpora.

12. The method of claim 1, further comprising: generating matching scores for each of a plurality of clues.

13. The method of claim 12, further comprising adding the matching scores.

14. The method of claim 13, further comprising weighting the matching scores.

15. A non-transitory computer readable medium having embodied thereon a program, the program being executable by a processor for performing a method for building a translation lexicon from non-parallel corpora, the method comprising:
   identifying identically spelled words in a first corpus and a second corpus, the first corpus including words in a first language and the second corpus including words in a second language, wherein the first corpus and the second corpus are non-parallel and are accessed by the machine translation system;

generating a seed lexicon by the machine translation system, the seed lexicon including identically spelled words; and expanding the seed lexicon by the machine translation system by identifying possible translations of words in the first and second corpora using one or more clues.

16. The non-transitory computer readable medium of claim 15 wherein said expanding comprises using the identically spelled words in the seed lexicon as accurate translations.

17. The non-transitory computer readable medium of claim 15, further comprising:
identifying substantially identical words in the first and second corpora; and
adding said substantially identical words to the seed lexicon.

18. The non-transitory computer readable medium of claim 17, wherein said identifying substantially identical words comprises
applying transformation rules to words in the first corpora to form transformed words; and
comparing said transformed words to words in the second corpora.

19. The non-transitory computer readable medium of claim 15, wherein said one or more clues includes similar spelling.

20. The non-transitory computer readable medium of claim 15, wherein said identifying comprises identifying cognates.

21. The non-transitory computer readable medium of claim 15, wherein said identifying comprises identifying word pairs having a minimum longest common subsequence ratio.

22. The non-transitory computer readable medium of claim 15, wherein said one or more clues includes similar context.

23. The non-transitory computer readable medium of claim 15, wherein said identifying comprises:
identifying a plurality of context words; and
identifying a frequency of context words in an n-word window around a targetword.

24. An apparatus comprising:
a word comparator operative to be executed to identify identically spelled words in a first corpus and a second corpus and build a seed lexicon including said identically spelled words, the first corpus including words in a first language and the second corpus including words in a second language, the first corpus and the second corpus are not parallel; and
a lexicon builder operative to be executed to expand the seed lexicon by identifying possible translations of words in the first and second corpora using one or more clues.

25. The apparatus of claim 24, wherein the lexicon builder is configured to use the identically spelled words in the seed lexicon as accurate translations.

26. The apparatus of 24, further comprising a matching module operative to be executed to match strings in the two non-parallel corpora to generate a parallel corpus including the matched strings as translation pairs.

27. The apparatus of claim 26, the apparatus comprising:
an alignment module operative to be executed to align text segments in two nonparallel corpora, the corpora including a source language corpus and a target language corpus.

28. The apparatus of claim 27, wherein the alignment module is operative to build a Bilingual Suffix Tree from a text segment from one of said two non-parallel corpora.

* * * * *